United States Patent
Alqahtani

(10) Patent No.: US 10,738,572 B2
(45) Date of Patent: Aug. 11, 2020

(54) APPARATUS AND METHOD FOR PRODUCING OIL AND GAS USING BUOYANCY EFFECT

(71) Applicant: Saudi Arabian Oil Company, Dhahran (SA)

(72) Inventor: Mari Hussain Alqahtani, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 78 days.

(21) Appl. No.: 14/495,952

(22) Filed: Sep. 25, 2014

(65) Prior Publication Data
US 2015/0090460 A1 Apr. 2, 2015

Related U.S. Application Data

(60) Provisional application No. 61/884,724, filed on Sep. 30, 2013.

(51) Int. Cl.
*E21B 43/01* (2006.01)
*E21B 43/12* (2006.01)
(Continued)

(52) U.S. Cl.
CPC ...... *E21B 43/0107* (2013.01); *B01D 17/0214* (2013.01); *B01D 19/00* (2013.01);
(Continued)

(58) Field of Classification Search
CPC .... B01D 17/0214; B01D 19/00; B65D 25/38; B65G 17/00; E02B 17/02;
(Continued)

(56) References Cited

U.S. PATENT DOCUMENTS

| 233,319 A | 10/1880 | Boerner |
| 2,293,196 A | 8/1942 | Crump |

(Continued)

FOREIGN PATENT DOCUMENTS

| DE | 102008016009 A1 | 10/2009 |
| WO | 2004004863 A1 | 1/2004 |

(Continued)

OTHER PUBLICATIONS

PCT International Search Report and the Written Opinion; dated May 4, 2015; International Application No. PCT/US2014/057195; International File Date: Sep. 24, 2014.
(Continued)

*Primary Examiner* — Matthew R Buck
*Assistant Examiner* — Patrick F Lambe
(74) *Attorney, Agent, or Firm* — Bracewell LLP; Constance G. Rhebergen; Vivek P. Shankam

(57) ABSTRACT

A system for bringing producing oil and gas from a subsea gathering manifold or wellhead, including a loop having an upper end at the surface and a lower end below the surface, the loop rotatable around a closed path, and production vessels attached to the cable loop, each production vessel having a hollow interior, the weight of the plurality of production vessels sufficient, when filled with seawater, to cause the production vessels to sink, the plurality of production vessels each having an inlet pipe. The system also includes a plurality of receivers attached to the production gathering manifold or wellhead that receive production fluid, the receivers engaging production vessels and filling them with well fluid while seawater is discharged from the production vessels, the production fluid having a lower density than ambient seawater so that the production vessels become buoyant when filled with the production fluid.

20 Claims, 17 Drawing Sheets

(51) Int. Cl.

| | |
|---|---|
| *B01D 17/02* | (2006.01) |
| *B01D 19/00* | (2006.01) |
| *E02B 17/02* | (2006.01) |
| *E21B 43/36* | (2006.01) |
| *B65D 25/38* | (2006.01) |
| *B65G 17/00* | (2006.01) |
| *E02B 17/00* | (2006.01) |

(52) U.S. Cl.
CPC ............. *B65D 25/38* (2013.01); *B65G 17/00* (2013.01); *E02B 17/02* (2013.01); *E21B 43/01* (2013.01); *E21B 43/0122* (2013.01); *E21B 43/121* (2013.01); *E21B 43/36* (2013.01); *E02B 2017/0039* (2013.01)

(58) Field of Classification Search
CPC ............. E02B 2017/0039; E21B 43/01; E21B 43/0122; E21B 43/121
USPC ............................................ 166/350; 27/338
See application file for complete search history.

(56) References Cited

U.S. PATENT DOCUMENTS

| | | | |
|---|---|---|---|
| 2,935,024 | A | 5/1960 | Kofahl |
| 2,947,437 | A | 8/1960 | Greer |
| 3,488,967 | A | 1/1970 | Toossi |
| 3,666,100 | A | 5/1972 | Madej |
| 4,139,463 | A | 2/1979 | Murphy et al. |
| 4,226,717 | A | 10/1980 | Malm |
| 4,283,159 | A | 8/1981 | Johnson et al. |
| 4,326,132 | A * | 4/1982 | Bokel ............... F03B 17/02 290/1 R |
| 4,380,151 | A | 4/1983 | Miller |
| 4,531,860 | A | 7/1985 | Barnett |
| 4,589,566 | A * | 5/1986 | Rives ............... F16J 13/24 220/316 |
| 4,604,196 | A | 8/1986 | Lowrie |
| 4,685,833 | A | 8/1987 | Iwamoto |
| 4,790,936 | A | 12/1988 | Renfrow |
| 5,044,440 | A | 9/1991 | Stinessen et al. |
| 5,117,914 | A | 6/1992 | Blandford |
| 5,154,835 | A | 10/1992 | Demichael |
| 5,224,482 | A | 7/1993 | Nikoonahad et al. |
| 5,226,482 | A | 7/1993 | Giannesini et al. |
| 6,238,569 | B1 | 5/2001 | Favret, Jr. |
| 6,990,809 | B2 | 1/2006 | Abouraphael |
| 7,886,829 | B2 | 2/2011 | Edwards |
| 8,173,012 | B1 | 5/2012 | Che |
| 8,663,467 | B1 | 3/2014 | Becker |
| 2002/0017193 | A1 | 2/2002 | Ramos |
| 2006/0032375 | A1 | 2/2006 | Verscharen |
| 2008/0105616 | A1 | 5/2008 | Allouche |
| 2008/0135257 | A1 | 6/2008 | Zhang et al. |
| 2009/0218297 | A1 | 9/2009 | Glessner et al. |
| 2012/0087729 | A1 | 4/2012 | Oesterberg et al. |
| 2012/0121335 | A1 | 5/2012 | Fedotov et al. |
| 2012/0247784 | A1 | 10/2012 | Lacy |
| 2013/0058722 | A1 | 3/2013 | Kryzak |
| 2013/0065799 | A1 | 3/2013 | Leinweber et al. |
| 2013/0118754 | A1 | 5/2013 | Worrall et al. |
| 2013/0140755 | A1 * | 6/2013 | Ninomiya ......... A61F 13/15764 271/3.14 |
| 2013/0193048 | A1 | 8/2013 | Theegala |
| 2013/0199792 | A1 | 8/2013 | Backes |
| 2014/0008304 | A1 | 1/2014 | Jansen et al. |
| 2015/0240605 | A1 | 8/2015 | Vu et al. |

FOREIGN PATENT DOCUMENTS

| | | | | |
|---|---|---|---|---|
| WO | | 2013030605 A2 | 3/2013 | |
| WO | WO 2013030605 A2 * | | 3/2013 | ............ B63B 38/00 |

OTHER PUBLICATIONS

Partial International Search Report and Written Opinion for related PCT application PCT/US2014/057195 dated May 4, 2015.

PCT International Search Report and The Written Opinion of the International Searching Authority dated Jul. 20, 2015; International Application No. PCT/US2014/057178; International Filing Date: Sep. 24, 2014.

* cited by examiner

APPARATUS AND METHOD FOR PRODUCING OIL AND GAS USING BUOYANCY EFFECT

CROSS REFERENCE TO RELATED APPLICATION

This application claims priority to and the benefit of U.S. Provisional Application Ser. No. 61/884,724, which was filed Sep. 30, 2013, the full disclosure of which is hereby incorporated herein by reference in its entirety.

BACKGROUND OF THE INVENTION

1. Field of the Invention

The present technology relates to oil and gas production. In particular, the present technology relates to oil and gas production from subsea gathering manifolds or wells using buoyancy.

2. Description of the Related Art

The production of oil and gas from subsea gathering manifolds or oil wells typically requires raising the oil and gas through a riser from the seabed to the sea surface. This procedure has inefficiencies, including, for example, pressure drop within the riser. This pressure drop increases when the crude oil pressure falls below the bubble point, which changes the flow from a single-phase to a two-phase flow.

SUMMARY OF THE INVENTION

One embodiment of the present technology provides a system for bringing produced oil and gas from a subsea wellhead to a sea surface. The system includes a cable loop having an upper end at or adjacent a sea surface and a lower end below the sea surface, the loop rotatable around a closed path, and a plurality of production vessels attached to the cable loop, each production vessel having a hollow interior that can be filled with seawater, the weight of the plurality of production vessels sufficient, when filled with seawater, to cause the production vessels to sink, the plurality of production vessels each having an inlet pipe attached thereto. The system also includes a plurality of receivers in communication with a subsea wellhead that receive production fluid from the subsea wellhead, the plurality of receivers configured to engage the plurality of production vessels and fill them with production fluid while seawater in the production vessels is discharged from the production vessels, the production fluid having a lower density than ambient seawater, thereby causing the production vessels to become buoyant.

In some embodiments, the system can include a gear attached to the cable loop to help rotate the cable loop. In addition, each of the plurality of production vessels can include a cylindrical body with having walls surrounding a hollow cavity, and a piston housed within the cylindrical hollow body and dividing the hollow void into two parts, the piston in sealed engagement with the walls of the cylindrical body and having a first position and a second position, in such embodiments, the piston which is connected to the cable loop through branching metallic cords, can create a vacuum in a portion of the hollow cavity as it moves from the first to the second position, which vacuum draws production fluid into the hollow cavity of the cylindrical body through the inlet pipe. Piston movement is due to the cable loop rotation as it pulls the branching metallic cords that are connected to each piston in the plurality of production vessels.

In still other embodiments, each of the plurality of production vessels can further include a vent between the hollow cavity of each production vessel and the ambient environment to allow seawater to exit each production vessel as the piston moves from the first to the second position. In addition, each of the plurality of production vessels can further include a piston lock to maintain the piston in the first position until the piston lock is released.

In alternate embodiments, the system can include a rotating valve that receives production fluid from a gathering manifold or a well, and a plurality of production hoses in fluid communication with the rotating valve, and extending from the rotating valve to the plurality of receivers. Furthermore, the system can further include a platform located at the sea surface and adjacent a portion of the cable loop for receiving production fluid carried by the plurality of production vessels, and a rotating valve located adjacent a gathering manifold or a wellhead and an alternate portion of the cable, the rotating valve for delivering production fluid to the production vessels, wherein the rotating valve is not located directly beneath the platform. In addition, the piston can be powered to move between the first and second positions by hydraulics or electricity.

Yet another embodiment of the present technology provides a method of producing oil and gas from a gathering manifold or a well. The method includes the steps of attaching a plurality of production vessels to a closed cable loop that extends from a sea surface to a subsea location, and transporting the plurality of production vessels from the sea surface to the subsea location, the plurality of production vessels having hollow cavities containing seawater so that they are not buoyant. In addition, the method includes filling the hollow cavities of the plurality of vessels with production fluid at the subsea location, the production fluid, displacing the seawater contained in the hollow cavities of the production vessels, so that the production vessels become buoyant and rise to the sea surface, and rotating the closed cable loop as the production vessels move from the sea surface to the subsea location and back to the sea surface.

In some embodiments, the method can further include separating a hollow cavity within each production vessel, with a piston, into a seawater containing portion and a production fluid containing portion, the piston sealing the seawater containing portion from the production fluid containing portion, and positioning the piston in a first position adjacent an end of the hollow cavity so that the seawater containing portion is more voluminous than the production fluid containing portion, as well as moving the piston from the first position to a second position remote from the end of the hollow cavity so that the production fluid containing portion increases in volume, and filling the production fluid containing portion of the hollow cavity with production fluid as the piston moves from the first position to the second position.

Furthermore, the method can include discharging the seawater from the seawater containing portion of the hollow cavity through vents in the production vessel as the piston moves from the first position to the second position, and/or filling multiple production vessels with production fluid simultaneously by fluidly connecting each of the multiple production vessels to a separate production hose in fluid communication with a well.

In other embodiments, the method can include locking the piston of each production vessel in the first position as the production vessel is transported from the sea surface to the subsea location, as well as draining the production fluid from the production vessels when the production vessels return to the sea surface from the subsea location, and refilling the production vessels with seawater.

Additionally, the method can include detaching the production fluid filled production vessels from the closed cable loop when the production vessels return to the sea surface from the subsea location, attaching new seawater filled production vessels to the closed cable loop in place of the detached production fluid filled production vessels, and/or driving the rotation of the closed cable loop using a gear attached to the closed cable loop.

BRIEF DESCRIPTION OF THE DRAWINGS

The present technology will be better understood on reading the following detailed description of nonlimiting embodiments thereof, and on examining the accompanying drawings, in which.

DETAILED DESCRIPTION OF THE EXEMPLARY EMBODIMENTS

Figure 1:
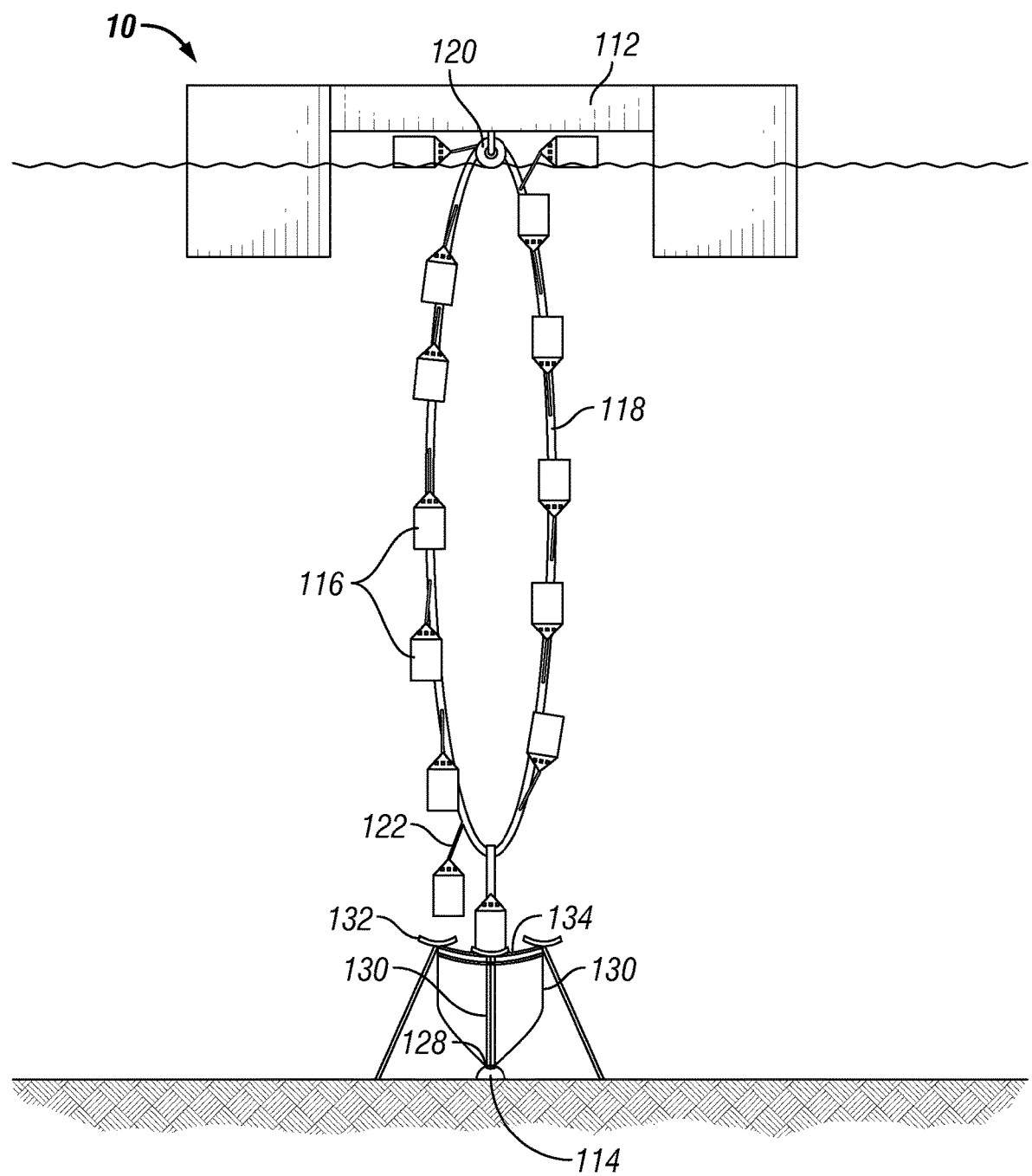
FIG. 1 is a side schematic view of an alternate system for producing oil and gas.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose.

In FIG. 1, there is shown an embodiment of the present technology capable of extending reservoir life, increasing ultimate recovery, eliminating capital investment in risers, increasing technical recovery, and reproducing from abandoned reservoirs. The system of this embodiment utilizes the buoyancy effect to remove the need to lift oil to the surface in risers, thereby eliminating pressure drop in risers, and increasing recovery and reserves.

Figure 2:
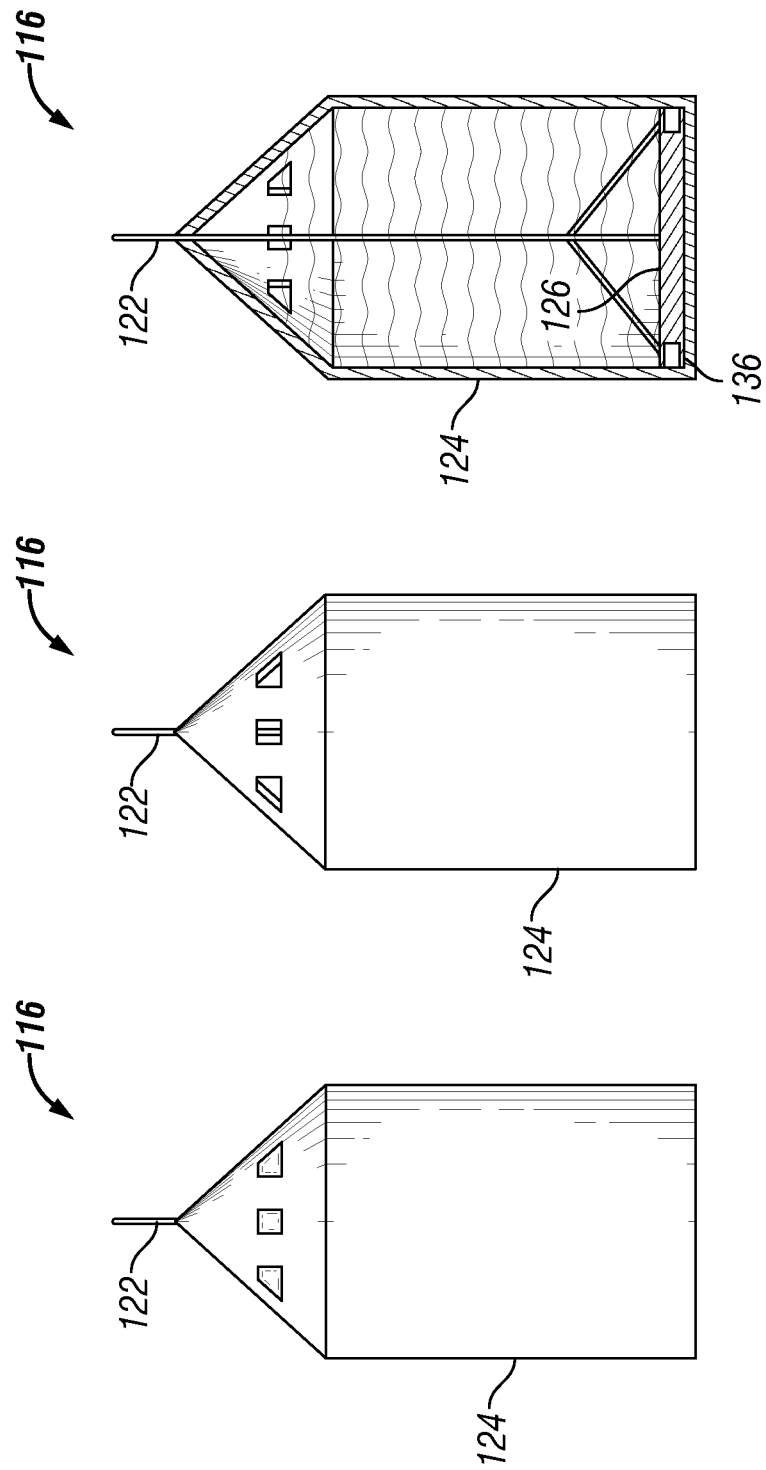
FIG. 2A is a side view of a production vessel of the system of FIG. 1 including closed seawater draining vents.
FIG. 2B is a side view the production vessel of FIG. 2A including open seawater draining vents.
FIG. 2C is a side cross-sectional view of the production vessel of FIG. 2A, including open seawater draining vents.
Figure 3:
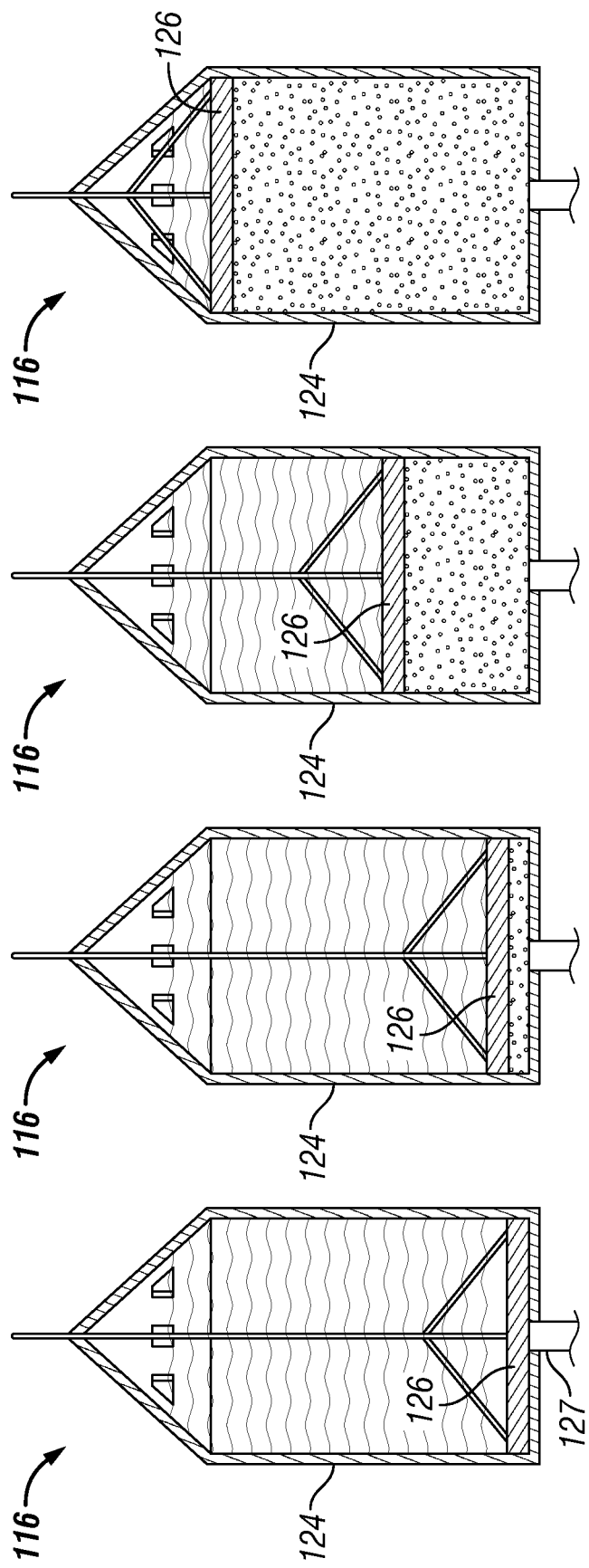
FIGS. 3A-3D are additional side cross-sectional views of the production vessel shown in FIGS. 2A-2C.

The embodiment depicted in FIG. 1 is an offshore production mechanism 110 wherein platforms 112 are not connected to production manifolds 114 by risers. Thus, production does not rely on pipe flow to reach the platform 112. Instead, the connection is accomplished through production vessels 116 connected to a loop 118 connected to a gear, which gear is in turn attached to the platform 112 at the sea surface. The loop 118 can be made of metal or any other suitable material. Several equally spaced, branch cords 122 can branch out from the loop 118. Each branch cord 122 connects to a production vessel 116. As shown in FIGS. 2A-2C, each production vessel 116 can consist of a cylindrical chamber 124, a piston 126 (connected to the branch cord 122), and an inlet pipe 127 (shown in FIGS. 3A-3D).

Referring back to FIG. 1, the production vessels 116 are filled up with seawater at the platform 112. Then the gear 120 rotates, driving the loop 118, and lowering the seawater filled production vessels 116 towards the production manifold 114. According to some embodiments, when a production vessel 116 is filled with seawater, the piston 126 can be locked into the bottom of the production vessel 116 using piston locks 136 (shown in FIG. 2C). The weight of the seawater-filled production vessels 116 pulls down on the branch cords 122, which creates tension that pulls down on the loop 118. In certain embodiments, the weight of the seawater-filled production vessels 116 alone is enough to drive the loop 118, without aid from the gear 120.

Figure 4:
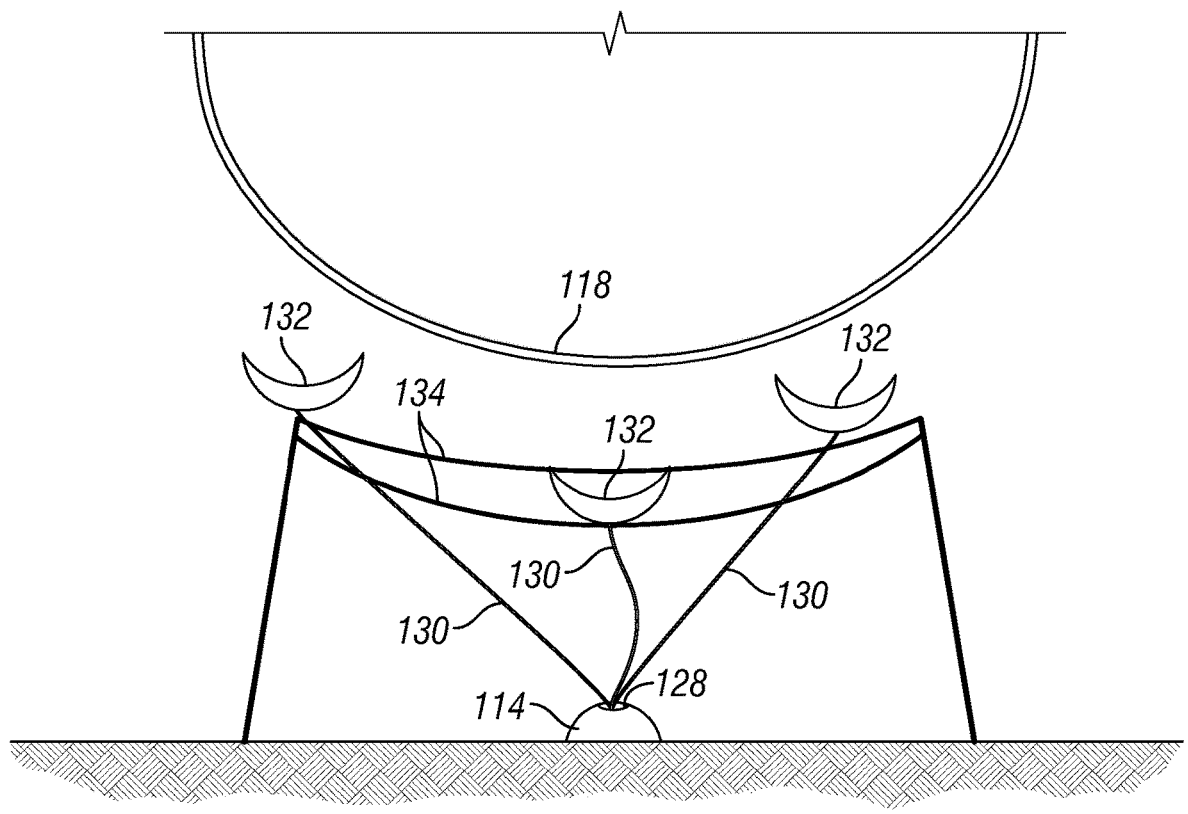
FIG. 4 is a side schematic view of a bottom portion of the system for producing oil and gas shown in FIG. 1.
Figure 5:
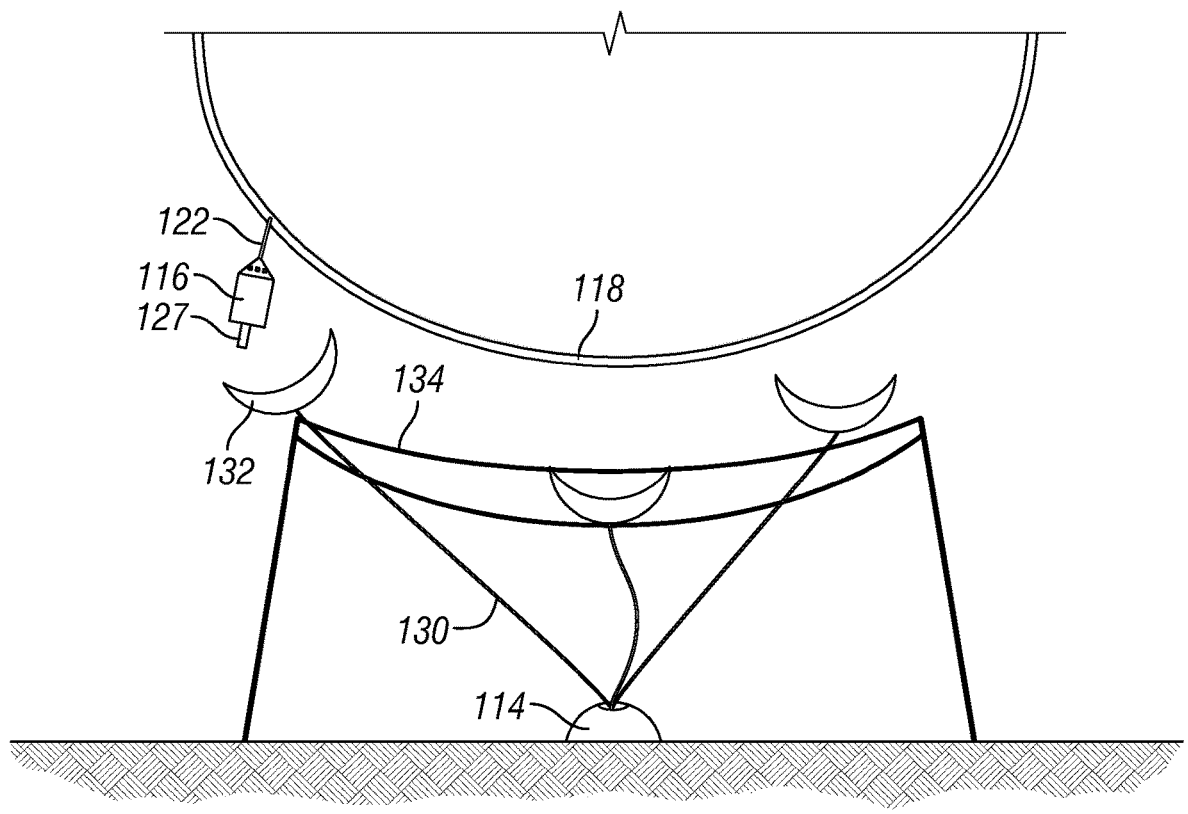
FIG. 5 is an alternate side schematic view of the bottom portion shown in FIG. 4.
Figure 6:
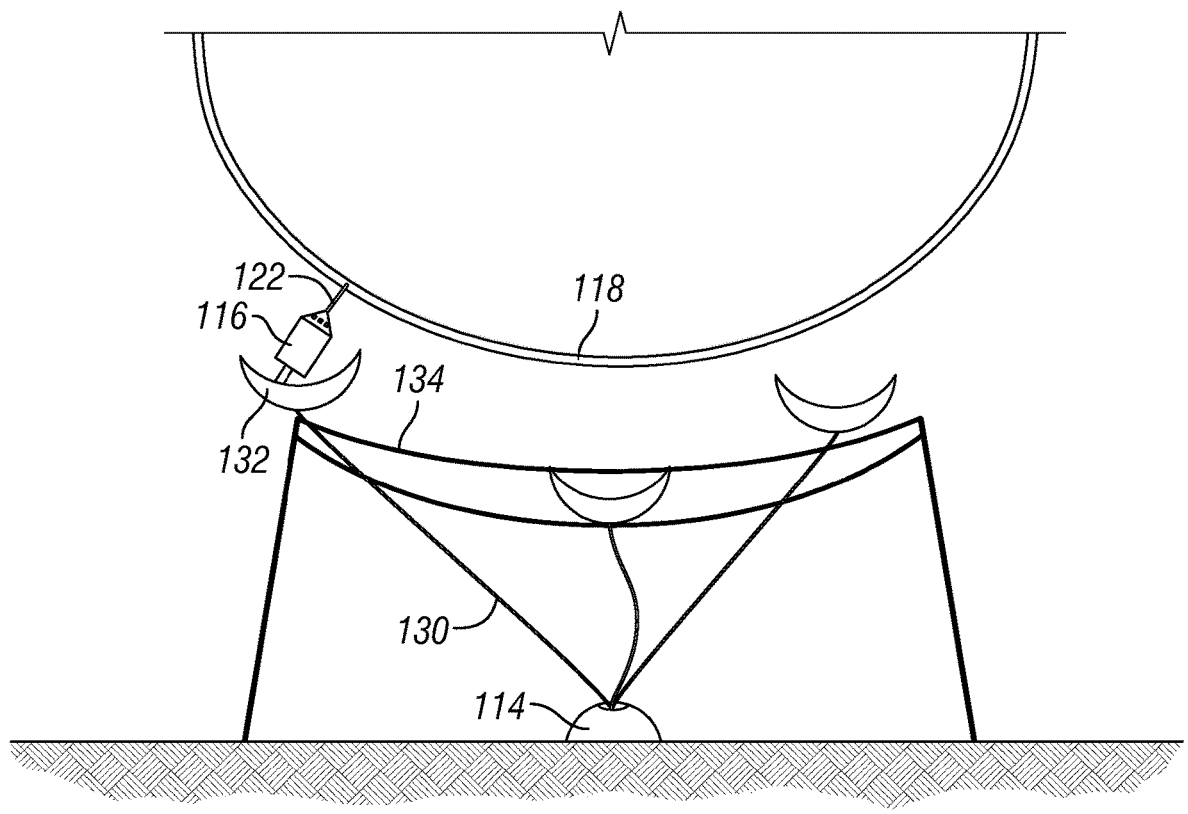
FIG. 6 is another alternate side schematic view of the bottom portion shown in FIG. 4.
Figure 7:
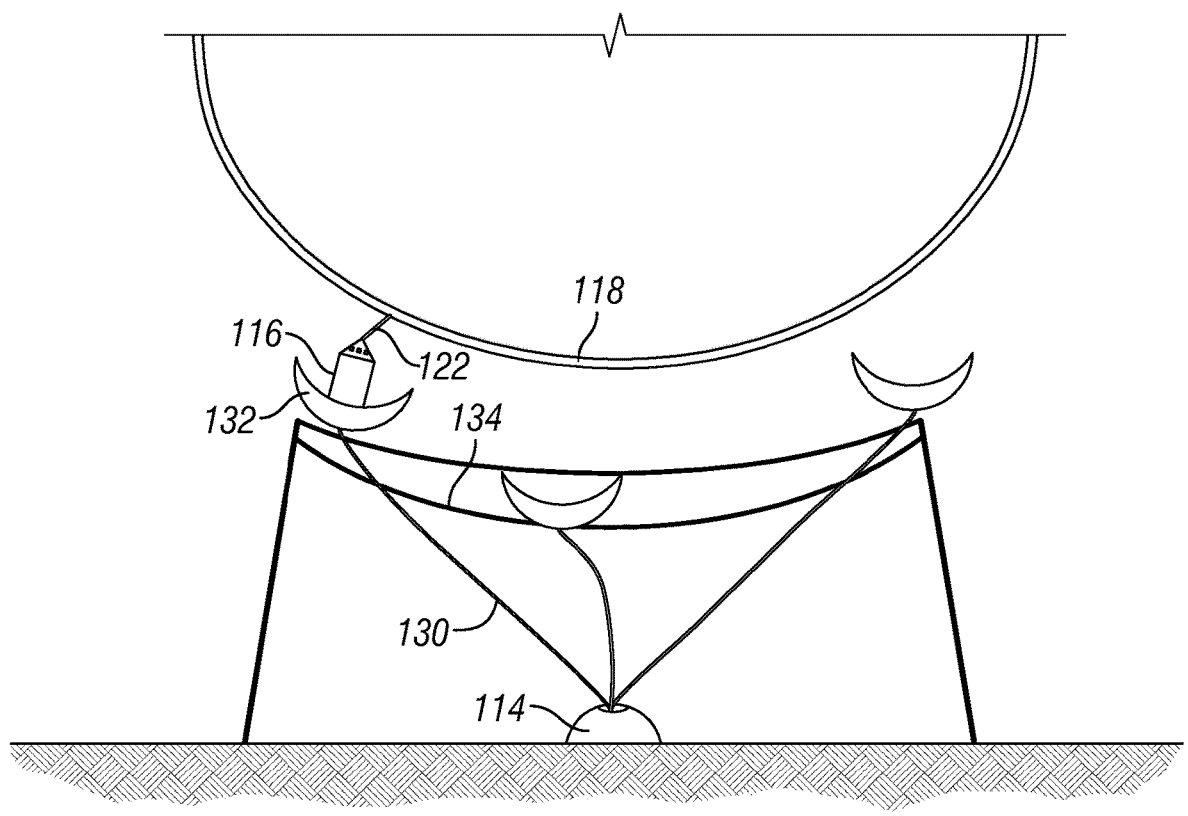
FIG. 7 is another alternate side schematic view of the bottom portion shown in FIG. 4.
Figure 8:
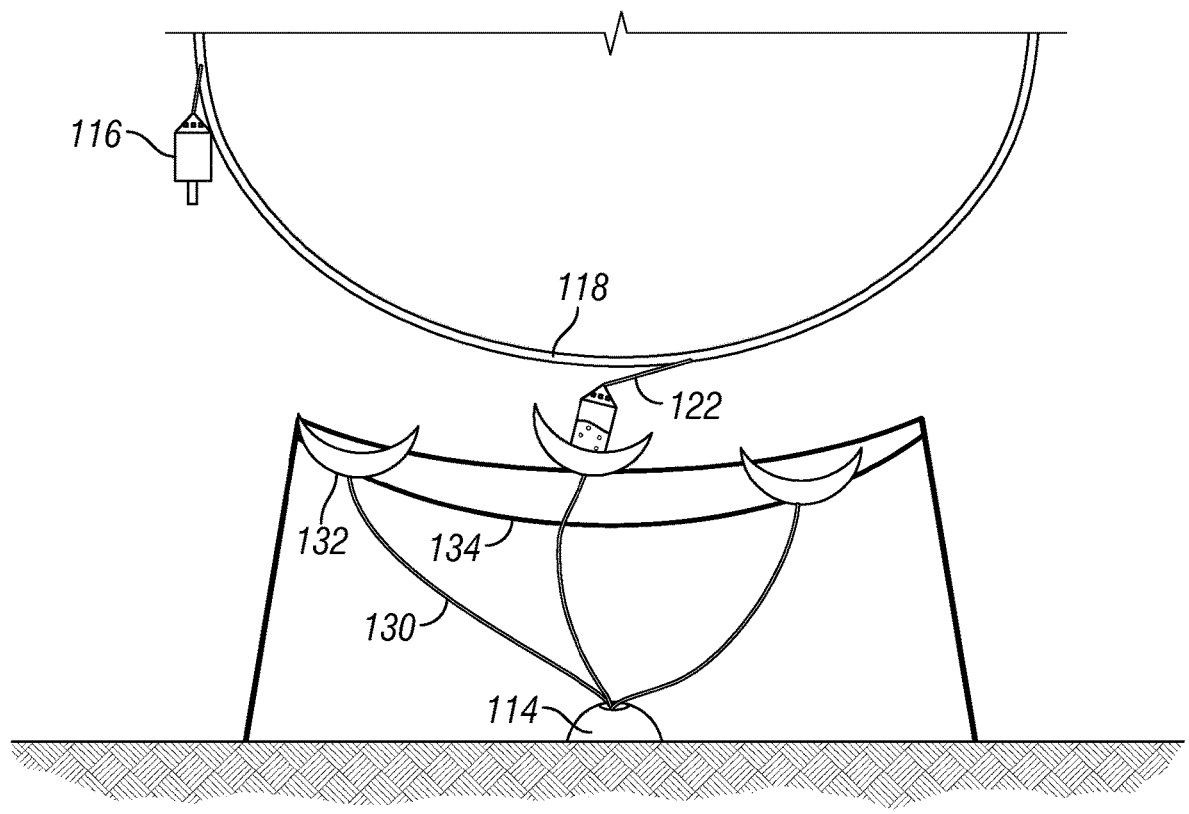
FIG. 8 is another alternate side schematic view of the bottom portion shown in FIG. 4.
Figure 9:
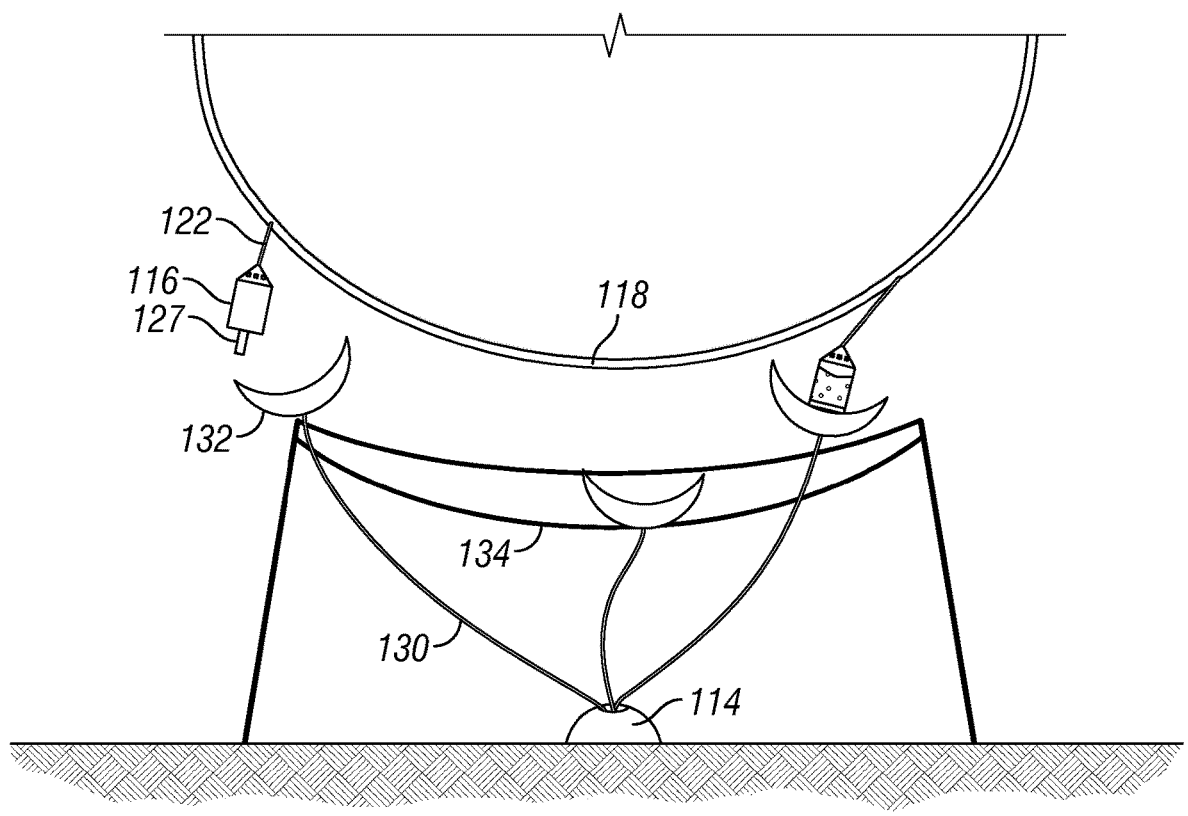
FIG. 9 is another alternate side schematic view of the bottom portion shown in FIG. 4.

The production manifold 114 consists of a gathering flowline (not shown) that feeds all field production to a dividing and rotating valve 128. The valve 128 feeds into three production hoses 130. The other side of each production hose 130 is connected to a vessel receiver 132 (shown in greater detail in FIG. 4). All vessel receivers 132 are placed on an elliptical rail 134 that is concaved upward. The receivers' 132 motion is mechanically synchronized so that they attach to the inlet pipe 127 (as shown in FIG. 6) of an available production vessel 116 at the right time and location. In embodiments having piston locks 136, contact with the vessel receiver 132 or inlet pipe 127 unlocks the piston.

Once the connection is made, and as shown in FIGS. 3A-3D, the piston 126 is allowed to move, and the branch cord 122 pulls the piston 126 in a syringe-like motion from the bottom of the production vessel 116 toward the top. In the embodiments shown, the piston 126 is sealed to the inside surfaces of the production vessel 116, so that as the piston 126 rises from the bottom to the top of the production vessel 116, a vacuum is created below the piston 126. The vacuum pulls oil into the production vessel 116 through inlet pipe 127. Because the oil is buoyant, as discussed above, it will add some lift to the system as the production vessel 116 fills with oil.

Figure 10:
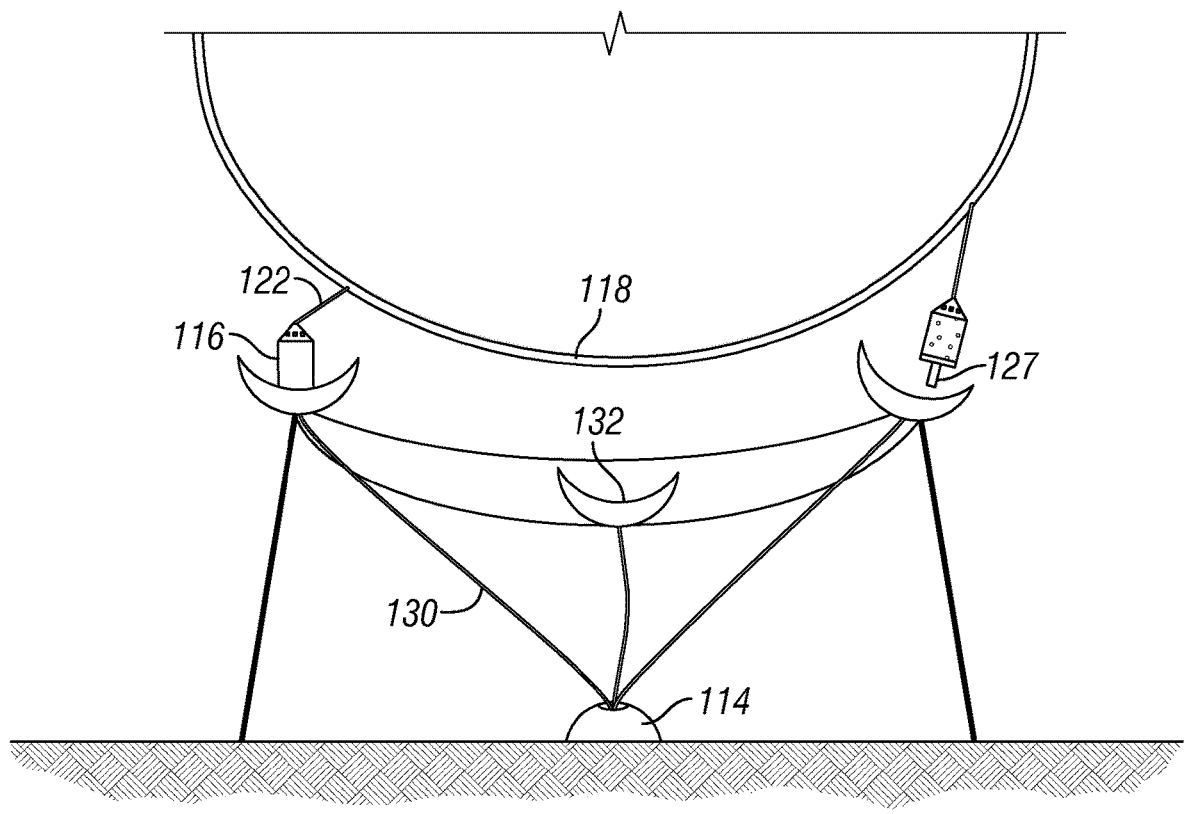
FIG. 10 is another alternate side schematic view of the bottom portion shown in FIG. 4.

When the production vessel 116 is filled with produced oil, the vessel receiver 132 releases it, as shown in FIG. 10, and the inlet pipe 127 closes. The entire process of filling the production vessels 116 with oil is shown in FIGS. 5-10. After the production vessel 116 is released, the oil trapped in the production vessel 116 will remain at the manifold pressure until a valve in the production vessel 116 is opened and the oil is drained. After the oil-filled production vessels 116 are released from the vessel receivers 132, they rise from seabed to sea level due to buoyancy and the movement of the loop 118. Rising production vessels 116 exert an upward force pulling on one side of the loop 118, due to tension. The magnitude of the upward force depends on the volume of the production vessels 116 and the density of the oil inside them.

Thus, there are three forces that cause the loop 118 to rotate, including the rotation of the gear 120, the downward forces created by the seawater-filled production vessels 116 on one side of the loop 118, and the upward buoyant forces created by the oil-filled production vessels 116 on the other side of the loop 118. Under most circumstances, the sum of the downward and upward forces alone will move the loop 118, raising the oil filled vessels 116 to the sea surface, without gear movement. The production vessels 116 that reach the platform are either loaded on a ship to be shipped to a nearby gas and oil separation plant (GOSP), or they are drained on the platform and then filled with seawater again.

The production vessels 116 rely on buoyant effects to transfer oil and gas to a sea surface. Buoyancy is an upward force exerted by a surrounding fluid on an immersed object. According to Archimedes law, the value of buoyant force is equal to the weight of the fluid the object displaces. Thus the net force exerted on a fully or partially immersed object becomes the summation of its weight (downward), overburden pressure (downward), and the buoyancy force (upward). The buoyant force is governed by the following equations:

$$F_{Net} = -M_{Object} * C_g - P_{OB} + F_{Buoyancy}$$

$$F_{Net} = -V_{Object} * \rho_{Object} * C_g - P_{OB} + V_{Object} * \rho_{Displaced\ Fluid} * C_g$$

$$F_{Net} = V_{Object} * C_g (\rho_{Displaced\ Fluid} - \rho_{Object}) - P_{OB}$$

In these equations, the symbols have the following meanings:
$F_{Net}$=Net Force
$M_{Object}$=Object Mass
$C_g$=Gravitation Acceleration Constant
$P_{OB}$=Overburden Pressure
$F_{Buoyancy}$=Buoyancy Force
$\rho_{Object}$=Object Density
$\rho_{Displaced\ Fluid}$=Displaced Fluid Density Therefore, when the difference between the object and the fluid densities is large enough to overcome the overburden pressure, the object raises upward. The immersed object can be solid, liquid, or gas. In this technology, the immersed object is a production vessel 116 filled with oil.

There are many advantages to the technology described herein. For example, this technology extends the life of offshore reservoirs, is safe and environmentally sound, can be applied at any stage of production even after abandonment, applies additional lift to help with production, and eliminates the problem of pressure drop in risers.

The method utilizes buoyancy effects in delivering oil and/or gas production from seabed to sea surface. This method applies to any offshore oil or gas field regardless of its depth, and at any production stage, including abandonment. The number of vessels utilized and their sizes are calculated for each reservoir; based on PVT properties of the crude oil, seabed depth, physical properties of the metal, and economic constraints.

This method utilizes buoyancy effects to significantly reduce the pressure of the manifold by eliminating the pressure drop associated with crude oil flow in risers. In addition, it further reduces the manifold pressure due to the suction exerted by the piston. In other words, the manifold pressure becomes the system's outlet pressure, instead of the platform pressure. Nodal analysis of the reservoir, wellbore, and facilities system dictates that the eliminated pressure drop results in lower abandonment reservoir pressure. This in turn increases the ultimate recovery of the reservoir, and potentially increases reserves.

One reason that buoyancy aids in the production of oil in the present technology is because of the hot-air balloon effect. In other words, oil produced at the manifold is hot and significantly lower in density than ambient cold seawater. In fact, as the piston 126 displaces the seawater that is filling the production vessel 116, lighter density oil fills up the displaced volume. The created density difference (between ambient seawater and oil) exerts an upward force on the inner walls of the production vessel 116 until it overcomes the external downward forces. At that time buoyant forces lift the oil filled production vessel 116 upward, analogous to a hot-air balloon.

It is to be understood that the shape of the production vessels 16, while shown to be generally cylindrical, can be any appropriate shape. Preferably, the volume of the production vessels 16 is calculated to maximize the buoyant force. In addition, the system described herein can be used in ultra-deep offshore reservoirs. However, engineering or economical considerations could prevent building a loop 118 long enough to stretch from the sea level all the way to the seabed. In such a case, the production hoses 130 could be increased in length to compensate for the added distance from the rotating valve 128 to the production vessels 116. In some embodiments, the rotating production hoses could be metallic pipelines, and the elliptical rail 134 (holding the vessel receivers 132) could take a different shape to accommodate for their fixed length.

Figure 11:
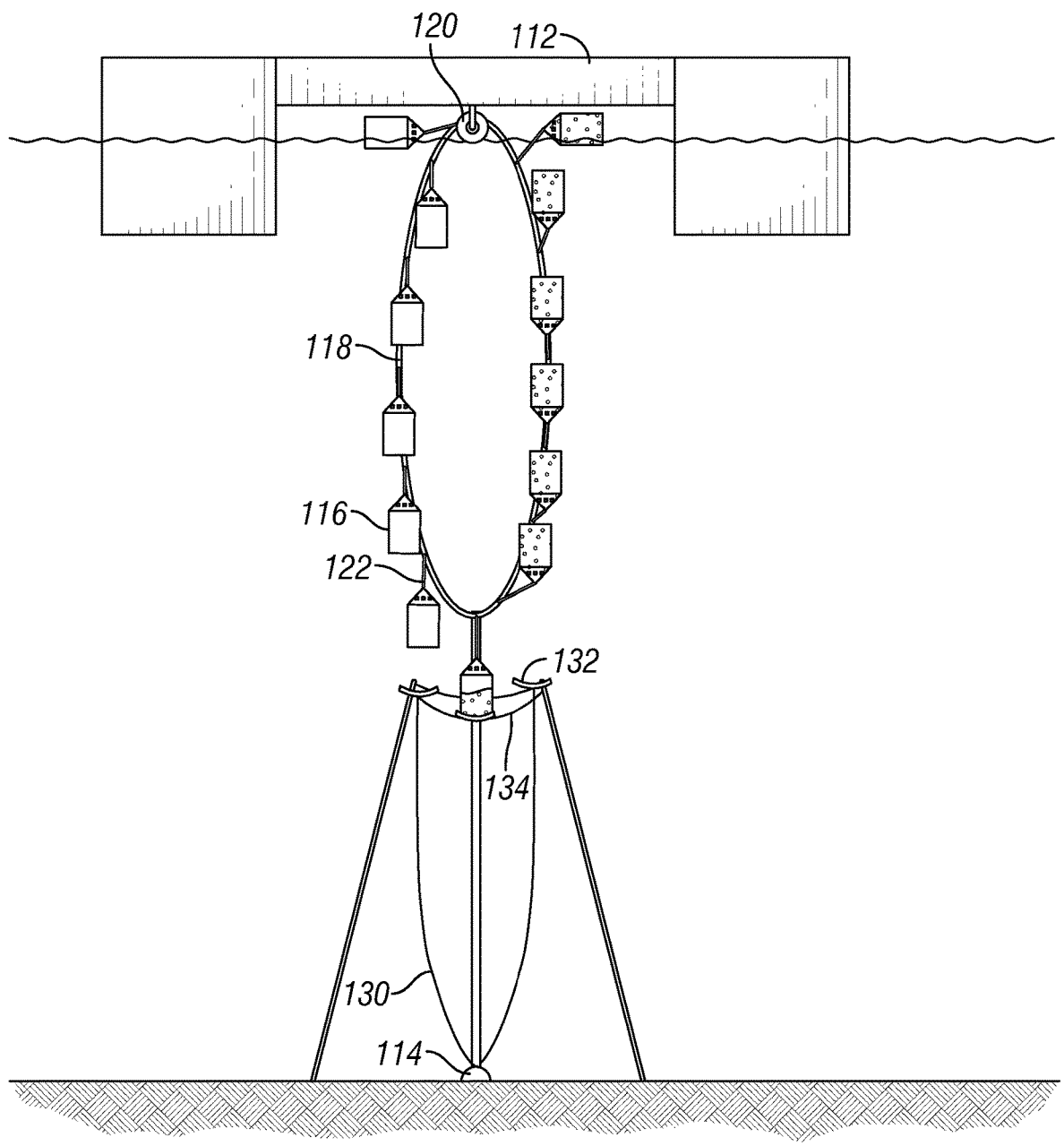
FIG. 11 is a side schematic view of an alternate embodiment of an oil and gas production system.

In some instances, such as where the economics of a well make it impractical to implement a full-scale loop 118 and production vessels 116 that stretch from the platform 112 to the sea bottom, a smaller scale system can be used (see FIG. 11). However, the riser pressure drop saved utilizing a shorter loop 118 is lower than that saved by the use of full-scale embodiments.

Figure 12:
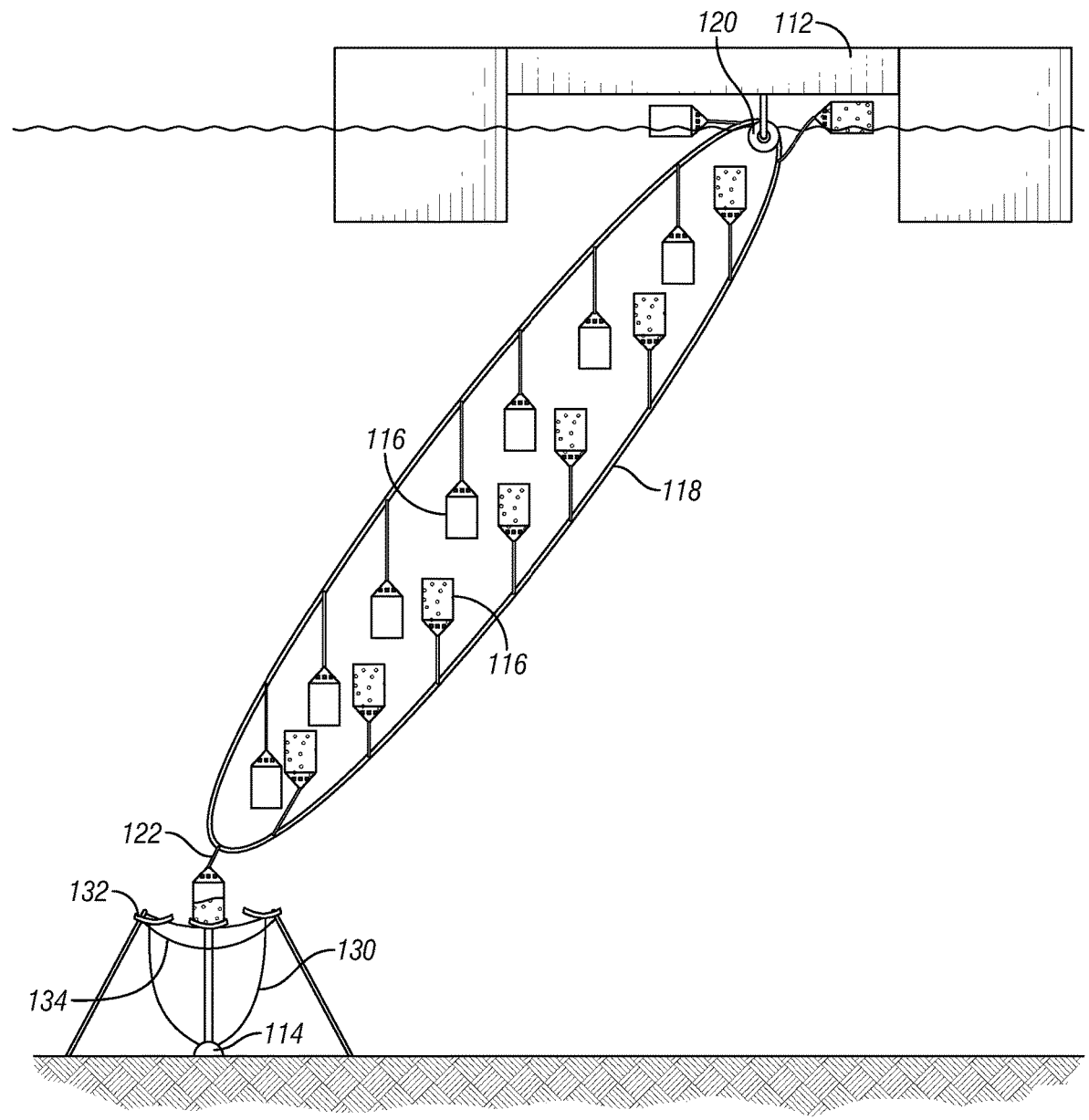
FIG. 12 is a side schematic view of yet another alternate embodiment of an oil and gas production system.

Alternatively, as shown in FIG. 12, in some instances the platform 112 can be fixed in one location, and the manifold 114 can be fixed at a different location, so that the manifold 114 is not located directly underneath the platform 112. In such an instance, the loop 118 can be directed at an angle to connect the platform 112 to the manifold 114. In such an embodiment, Buoyancy will still apply an upward force on the metallic cord.

Figure 13:
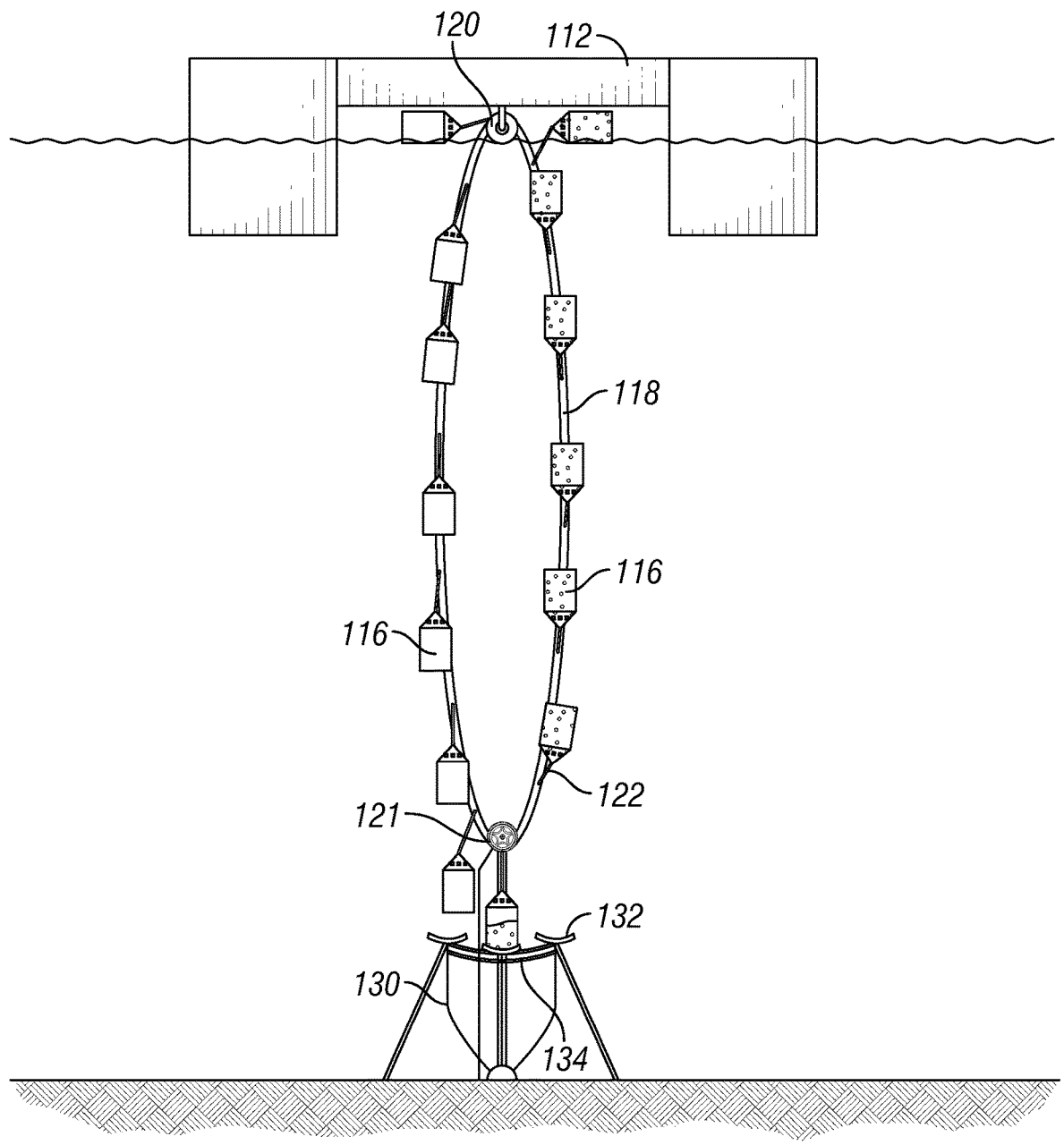
FIG. 13 is a side schematic view of another embodiment of oil and gas production system.
Figure 14:
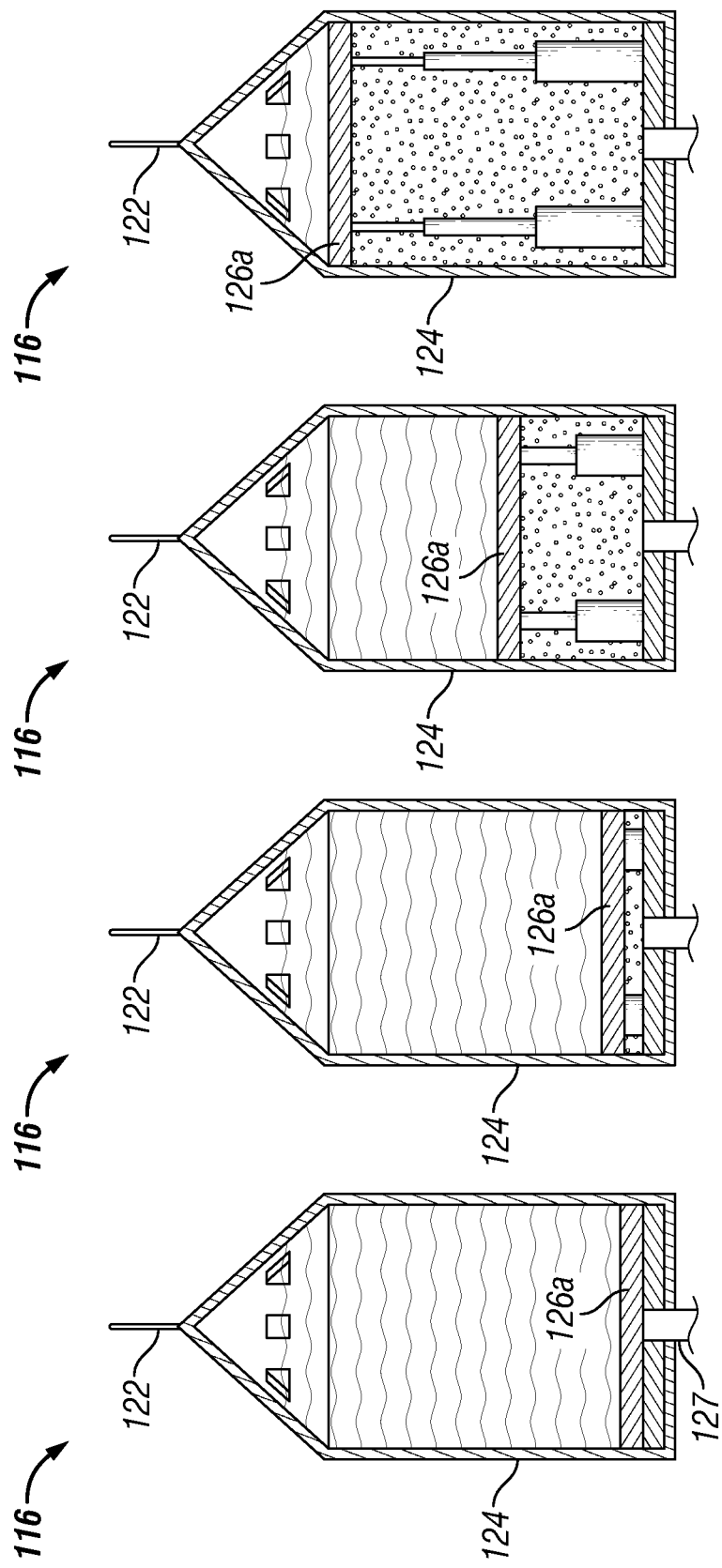
FIGS. 14A-14D are side cross-sectional views of an alternate embodiment of the production vessel of an oil and gas production system.

Other embodiments remedy the situation where the rotating gear 120 cannot provide the needed torque to rotate the loop 118, which means that the branch cord 122 cannot pull the piston 126 to fill the production vessels 132 with oil. In one embodiment, another gear 121 is added at the bottom of the loop 118, as shown in FIG. 13. This adds more stability to the loop 118, and more power to rotate it. In another embodiment, the cord-pulled piston 126 can be replaced with a hydraulic, electric, or mechanic piston 126a, as shown in FIGS. 14A-14D. In this embodiment, the branch cords 122 connect the tip of the production vessel 116 to the loop 118, instead of pulling the piston 126.

The present technology also provides a method for producing oil, that includes starting with the platform 112 in position. The rotating valve 128 is installed and connected to the three rotating production hoses 130, which are in turn each connected to a vessel receiver 132. The inlet pipe 127 of each production vessel 116 can snap tight into the vessel receiver 132 upon contact.

According to the method, the vessel receivers 132 are placed on the concave elliptical rail 134, and are synchronized to receive the production vessels 116 as they arrive, and to release them when they have been filled with oil. The three hoses 130 alternate in production, one hose at a time, assuring continuous flow from the manifold 114 while the production vessels 116 are alternating.

A rotating gear 120, located at the platform 112, rotates the loop 118 that starts at the platform 112 and ends near the manifold 114 at the seabed. Several branch cords 122 connect the loop 118 with the piston 126 in each production vessel 116, which consists of a cylindrical chamber, piston 126 (connected to a branch cord 122), seawater draining vents, and an oil inlet (and outlet) pipe 127.

Production begins when the gear 120 rotates and moves one side of the loop 118 down toward the manifold 114. At the platform 112, production vessels 116 are filled with seawater. They exert a downward force on the branch cord 122 that is connected to the loop 118, thereby helping to move the loop 118.

As the seawater filed production vessels 116 reach the manifold 114 at the sea bottom, they contact synchronized vessel receivers 132. The inlet pipe 127 at the bottom of each production vessel 116 snaps into a corresponding vessel receiver 132, and becomes securely connected to it. In those embodiments having piston locks 136, the piston 126 in the connected production vessel 116 is unlocked and becomes free to be pulled by the branch cord 122. As the loop 118 continues in its rotating motion, it pulls on the branch cord 122 and creates tension, which pulls the piston 126 upward. The piston 126 movement creates a vacuum, which pulls oil into the production vessel 116 through the inlet pipe 127.

When the production vessel 116 reaches the end of the elliptical rail 134, the vessel receiver 132 releases it, and the inlet pipe 127 closes. Buoyant forces lift the oil-filled production vessel 116 upward, and the branching cord 122 (which is attached to the oil-filled production vessel 116), in turn pulls the loop 118 upward as well.

The oil-filled production vessels 116 will maintain their manifold pressure until the oil is drained. As the oil-fined production vessels 116 reach the platform 112, they either are loaded onto ships or drained at the platform 112. If the oil-filled production vessels 116 are loaded onto ships, new production vessels 116 replace them on the loop 118. Otherwise, the vessels 116 are refilled with seawater and reattached to the loop 118.

Models and Experiments

To illustrate the effect of utilizing the production vessels described above with regard to the second embodiment, a reservoir model was built assuming production through risers (model 1) and two additional models were built assuming production through the proposed vessels (model 2, and 3). The parameters of the three models are the same except for variation in the minimum flowing bottom-hole pressure (FBHP) of the oil well associated with each model. In model 1, the minimum FBHP was set to about 5,500 psi. Pressure drop in risers varies significantly with reservoir water depth and production stage. Therefore, two reasonable pressure drop values were considered. In model 2, the wellbore pressure drop due to the pressure drop in the riser is assumed to be about 1,000 psi. Therefore, FBHP was equal to about 4,500 psi in model 2. In model 3, the wellbore pressure drop due to the pressure drop in the riser was assumed to be about 2,000 psi. Therefore, FBHP was equal to about 3,500 psi in model 3.

All models share the following properties and parameters:
2 Dimensional model
10×10 cells
Each cell is 2,500 ft×2,500 ft
Thickness=400 ft
Depth=12,000 ft
Initial Reservoir Pressure=9,000 psi
Bubble Point Pressure=4,000 psi
Porosity=25%
Horizontal Permeability=300 md
Vertical Permeability=50 md
The following PVT properties were used:

| P | Rs | Bo | z | viso | visg |
|---|---|---|---|---|---|
| 14.7 | 0 | 1 | 0.99999 | 1.2 | 0.0125 |
| 400 | 165 | 1.012 | 0.8369 | 1.17 | 0.013 |
| 800 | 335 | 1.0255 | 0.837 | 1.14 | 0.0135 |
| 1200 | 500 | 1.038 | 0.8341 | 1.11 | 0.014 |
| 1600 | 665 | 1.051 | 0.8341 | 1.08 | 0.0145 |
| 2000 | 828 | 1.063 | 0.837 | 1.06 | 0.015 |
| 2400 | 985 | 1.075 | 0.8341 | 1.03 | 0.0155 |
| 2800 | 1130 | 1.087 | 0.8341 | 1 | 0.016 |
| 3200 | 1270 | 1.0985 | 0.8398 | 0.98 | 0.0165 |
| 3600 | 1390 | 1.11 | 0.8299 | 0.95 | 0.017 |
| 4000 | 1500 | 1.12 | 0.83 | 0.94 | 0.0175 |
| 9000 | 1510 | 1.121 | 0.8301 | 0.93 | 0.0176 |

Oil density=44.986
Gas gravity=0.92
The following relative permeability and capillary pressure values were used:

| SWT | | | |
|---|---|---|---|
| Sw | krw | krow | Pcow |
| 0.15109 | 0 | 1 | 400 |
| 0.180306 | 7.82404e-007 | 0.990592 | 27.3408 |
| 0.194914 | 6.62563e-006 | 0.983136 | 22.9409 |
| 0.22413 | 1.8312e-005 | 0.964242 | 18.3843 |
| 0.253346 | 3.68251e-005 | 0.943733 | 15.5504 |
| 0.282562 | 0.000105562 | 0.909425 | 14.3728 |
| 0.304915 | 0.000163382 | 0.883175 | 13.4719 |
| 0.326386 | 0.00021892 | 0.857961 | 12.6066 |
| 0.347104 | 0.000272509 | 0.805981 | 8.59783 |
| 0.37021 | 0.0230609 | 0.565222 | 0 |
| 0.375229 | 0.0293539 | 0.498658 | 0 |
| 0.403355 | 0.0713724 | 0.171756 | 0 |
| 0.43148 | 0.0868187 | 0.128584 | 0 |
| 0.459606 | 0.103824 | 0.0971953 | 0 |
| 0.487732 | 0.122245 | 0.0720211 | 0 |
| 0.51629 | 0.14238 | 0.0517967 | 0 |
| 0.545506 | 0.16506 | 0.0377328 | 0 |
| 0.574722 | 0.188013 | 0.0241556 | 0 |
| 0.603938 | 0.213077 | 0.015662 | 0 |
| 0.633154 | 0.239975 | 0.010302 | 0 |
| 0.656485 | 0.261489 | 0.00636467 | 0 |
| 0.676978 | 0.282264 | 0.00437906 | 0 |
| 0.698674 | 0.304301 | 0.00268985 | 0 |
| 0.720802 | 0.327792 | 0.0014622 | 0 |

-continued

SWT

| Sw | krw | krow | Pcow |
|---|---|---|---|
| 0.740862 | 0.350697 | 0.00114185 | 0 |
| 0.768988 | 0.382816 | 0.000692688 | 0 |
| 0.797113 | 0.414936 | 0.000243525 | 0 |
| 0.825239 | 0.442781 | 1.5985e−005 | 0 |
| 0.853364 | 0.46639 | 7.99251e−006 | 0 |
| 0.88149 | 0.49 | 0 | 0 |

SLT

| Sl | krg | krog | Pcog |
|---|---|---|---|
| 0.15109 | 1 | 0 | 3.9 |
| 0.168068 | 0.978622 | 0 | 3.85439 |
| 0.202025 | 0.935866 | 0 | 3.76318 |
| 0.231981 | 0.898146 | 0 | 3.68271 |
| 0.252959 | 0.871731 | 0 | 3.62636 |
| 0.280516 | 0.837034 | 0 | 3.55234 |
| 0.303894 | 0.796908 | 0 | 3.48053 |
| 0.32905 | 0.721718 | 0 | 3.35475 |
| 0.354828 | 0.641161 | 0 | 3.22586 |
| 0.377585 | 0.570047 | 0 | 3.11208 |
| 0.405763 | 0.499134 | 0 | 2.97118 |
| 0.426119 | 0.479104 | 0 | 2.8694 |
| 0.458476 | 0.453219 | 0 | 2.70762 |
| 0.490832 | 0.427334 | 0 | 2.54584 |
| 0.52461 | 0.400312 | 0 | 2.37695 |
| 0.555545 | 0.375564 | 0 | 2.22228 |
| 0.575545 | 0.359564 | 0 | 2.12227 |
| 0.60408 | 0.335921 | 0.000815925 | 1.97961 |
| 0.62648 | 0.31352 | 0.00529594 | 1.8676 |
| 0.648 | 0.292 | 0.00960004 | 1.76 |
| 0.672 | 0.268 | 0.0144 | 1.64 |
| 0.696 | 0.243687 | 0.0192 | 1.52 |
| 0.72 | 0.212 | 0.0360001 | 1.4 |
| 0.745327 | 0.176542 | 0.0562617 | 1.27337 |
| 0.768 | 0.1448 | 0.0744 | 1.16 |
| 0.792 | 0.1112 | 0.0935999 | 1.04 |
| 0.816 | 0.08752 | 0.1368 | 0.92 |
| 0.84 | 0.0688 | 0.192 | 0.800003 |
| 0.864174 | 0.049944 | 0.2476 | 0.67913 |
| 0.888 | 0.03136 | 0.3024 | 0.560002 |
| 0.915109 | 0.0164601 | 0.397991 | 0.424457 |
| 0.936 | 0.00880006 | 0.492 | 0.32 |
| 0.96 | 0 | 0.6 | 0.200001 |
| 0.976 | 0 | 0.759999 | 0.120001 |
| 1 | 0 | 1 | 0 |

The reservoir produced from 17 oil wells: 10 horizontal wells and 7 vertical wells. Initially, all horizontal producers operated under constant maximum flow rate of about 5,000 STB/D, and all vertical producers operated under constant maximum flow rate of about 2,000 STB/D. When the oil operators could not sustain their corresponding maximum flow rate, they switched to the minimum allowable FBHP (the value depends on each model, as described earlier).

Figure 15:
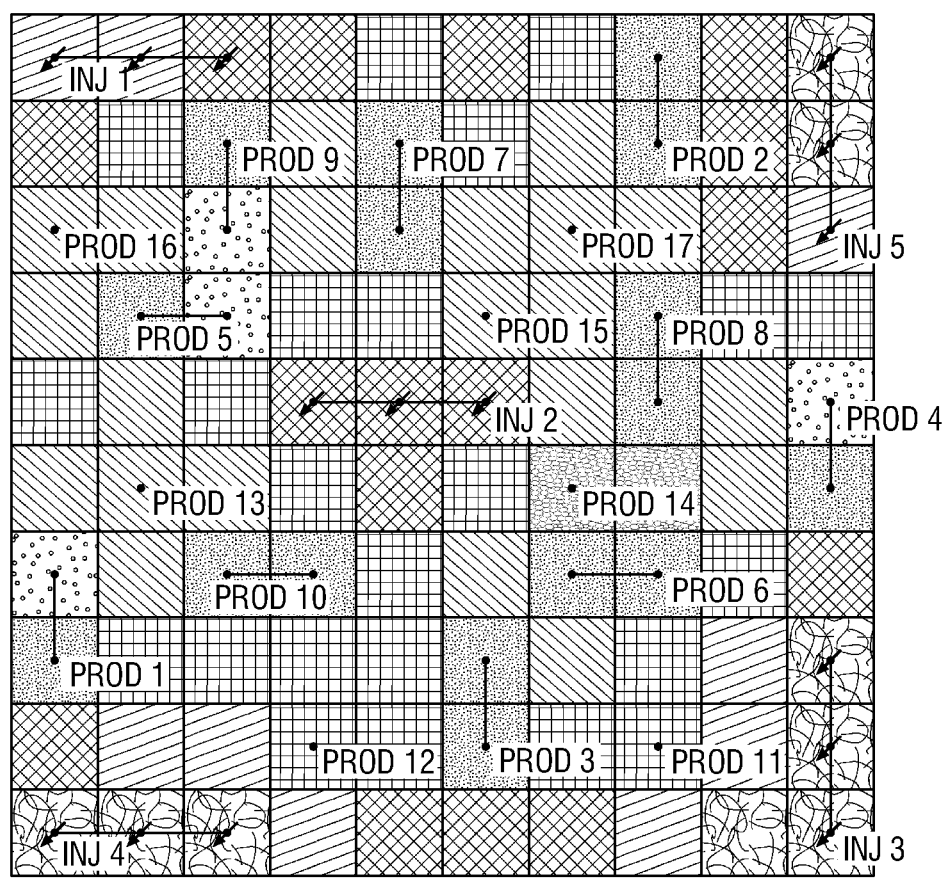
FIG. 15 is a two dimensional representation of a model reservoir according to an embodiment of the present technology.
Figure 16:
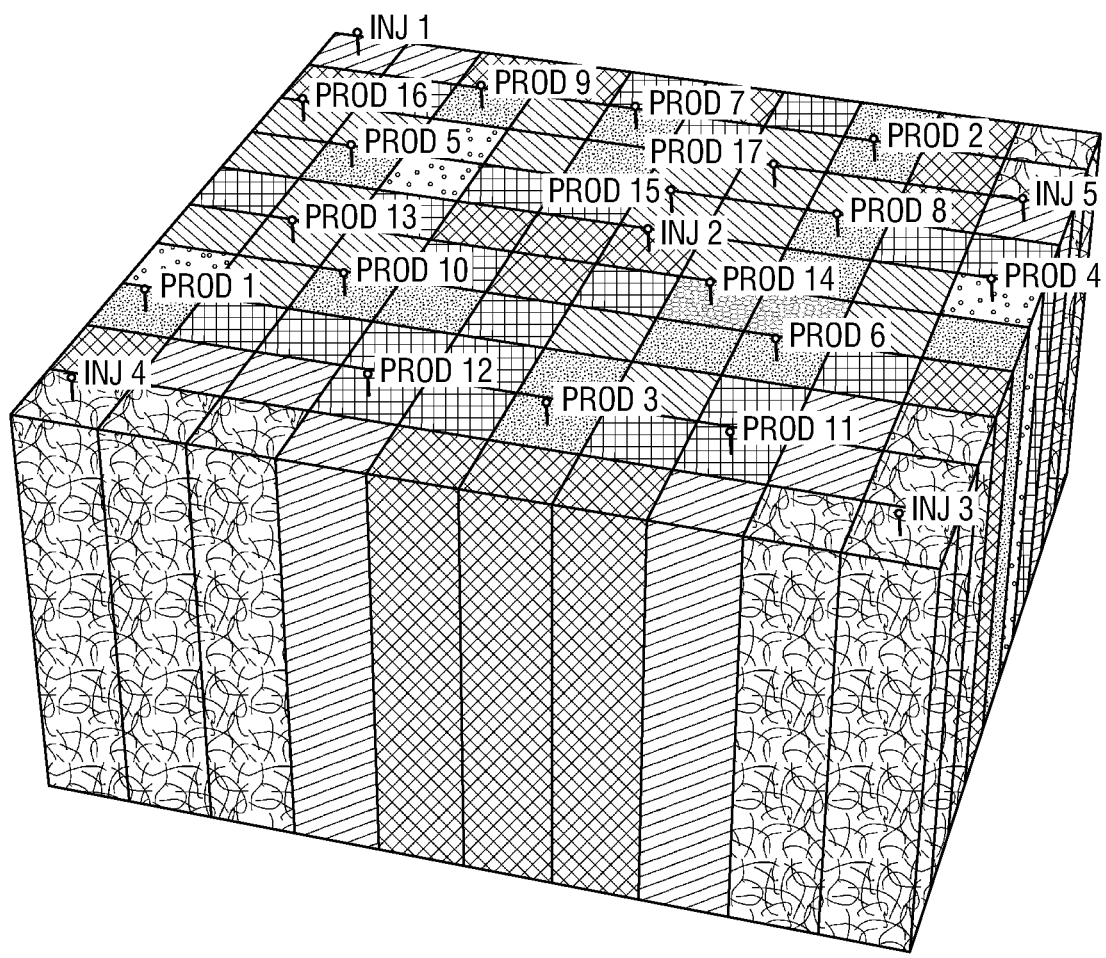
FIG. 16 is a three dimensional representation of the model reservoir of FIG. 15.

The reservoir had five horizontal water injectors (for pressure support), operating under maximum about 10,000 STBW/D injection rate. A two dimensional representation of the reservoir model is presented in FIG. 15, and a 3-D model is presented in FIG. 16.

Figure 17:
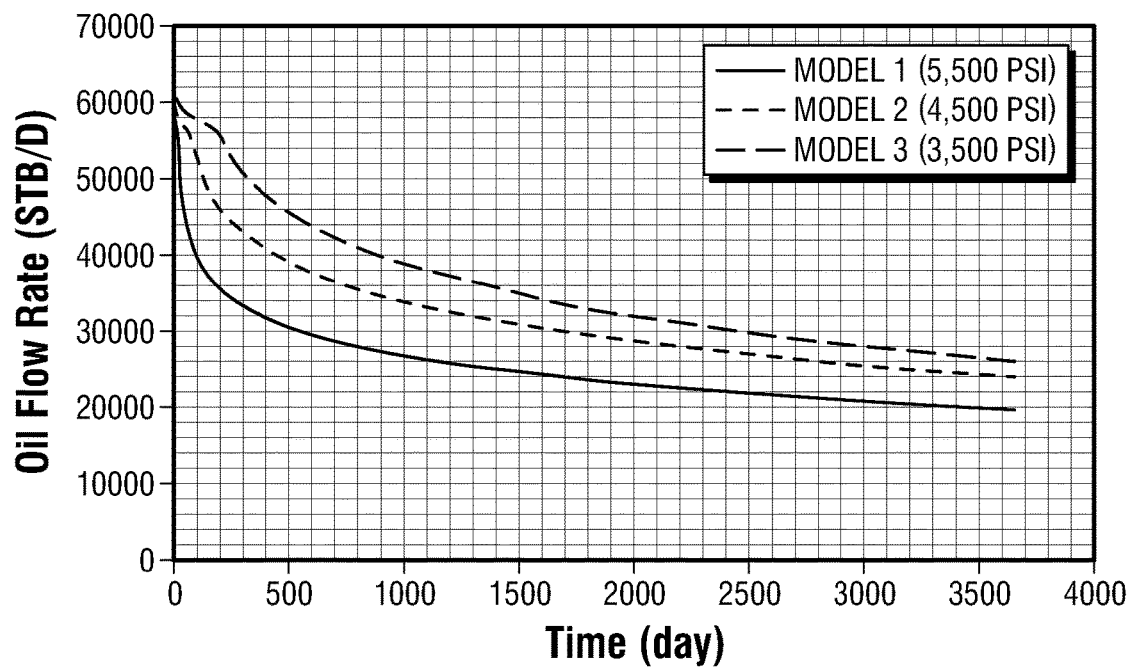
FIG. 17 is a chart showing the total reservoir production rate for different models representing embodiments of the present technology.
Figure 18:
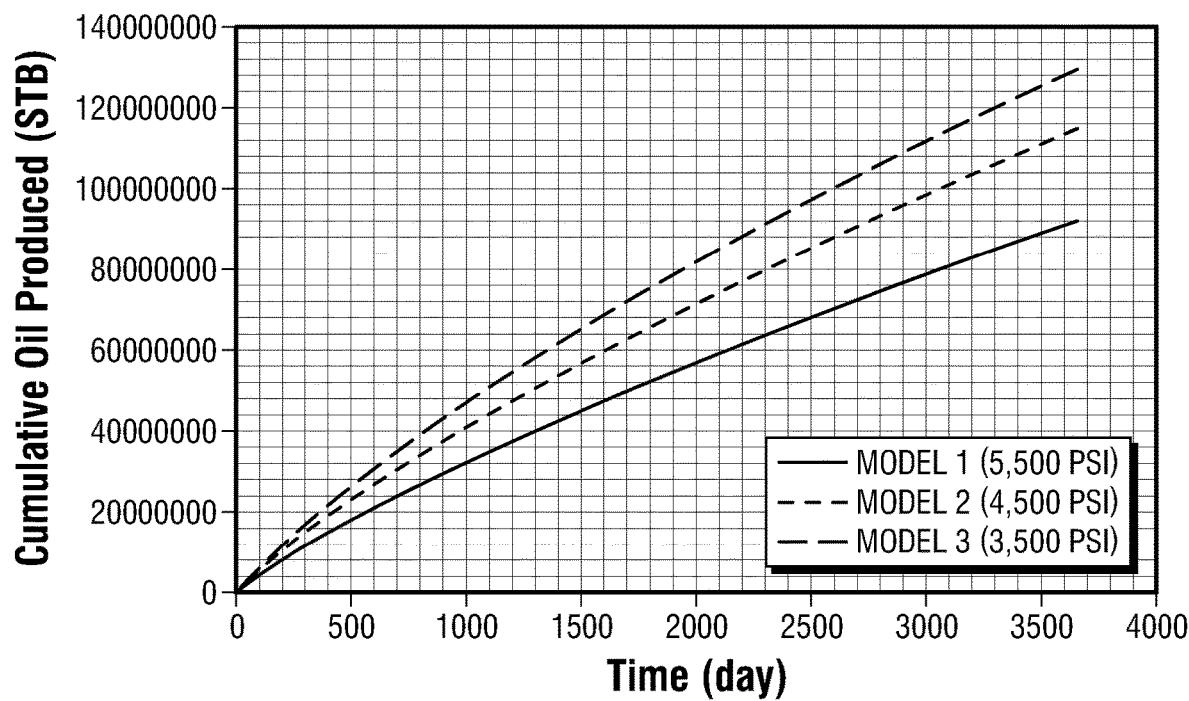
FIG. 18 is a chart showing total cumulative production for different models represented in FIG. 17.

The total reservoir production rate (STB/D) for each model over 10 years is presented in FIG. 17, and the cumulative production is presented in FIG. 18. The increase in cumulative oil produced from the base case (model 1) to the case with lowest FBHP (model 3) is about 41%. Please note as risers increase in length (the distance from sea surface to seabed) their pressure drop increases as well. Therefore, when the proposed vessel eliminates the riser pressure drop, the oil producers can produce under a lower FBHP (related to the riser pressure drop through nodal analysis). Lowering the FBHP in the oil wells, results in higher flow rates, thus increased recovery.

Although the technology herein has been described with reference to particular embodiments, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims.

Since total field production is connected to the vessels through a gathering manifold, each corresponding well can be completed normally with a Christmas tree. Therefore, PCT samples, logging, well testing, or artificial lift methods can be applied normally, and are not affected by the vessel.

What is claimed is:

1. A system for bringing produced oil and gas from a subsea wellhead to a sea surface, the system comprising:
    a cable loop having an upper end at or adjacent a sea surface and a lower end below the sea surface, the loop rotatable around a closed path;
    a plurality of production vessels attached to the cable loop, each production vessel having a hollow interior that can be filled with seawater, the weight of the plurality of production vessels sufficient, when filled with seawater, to cause the production vessels to sink, the plurality of production vessels each having an inlet pipe attached thereto; and
    a plurality of receivers in communication with a subsea wellhead that receive production fluid from the subsea wellhead, the plurality of receivers configured to engage the plurality of production vessels and fill them with production fluid while seawater in the production vessels is discharged from the production vessels, the production fluid having a lower density than ambient seawater, thereby causing the production vessels to become buoyant, wherein the plurality of receivers are placed on an elliptical rail that is concaved upward and are synchronized to receive the production vessels as the production vessels arrive, and to release the production vessels at the end of the elliptical rail when the production vessels have been filled with the production fluid.

2. The system of claim 1, further comprising:
    a gear attached to the cable loop to help rotate the cable loop.

3. The system of claim 1, wherein each of the plurality of production vessels comprises:
    a cylindrical body with having walls surrounding a hollow cavity; and
    a piston housed within the cylindrical hollow body and dividing the hollow void into two parts, the piston in sealed engagement with the walls of the cylindrical body and having a first position and a second position;
    wherein the piston creates a vacuum in a portion of the hollow cavity as it moves from the first to the second position, which vacuum draws production fluid into the hollow cavity of the cylindrical body through the inlet pipe.

4. The system of claim 3, wherein each of the plurality of production vessels further comprise:
    a vent between the hollow cavity of each production vessel and the ambient environment to allow seawater to exit each production vessel as the piston moves from the first to the second position.

5. The system of claim 3, wherein each of the plurality of production vessels further comprise:
a piston lock to maintain the piston in the first position until the piston lock is released by a receiver.

6. The system of claim 3, wherein the piston is powered to move between the first and second positions by hydraulics or electricity.

7. The system of claim 1, further comprising:
a rotating valve that receives production fluid from a well;
a plurality of production hoses in fluid communication with the rotating valve, and extending from the rotating valve to the plurality of receivers.

8. The system of claim 1, further comprising:
a platform located at the sea surface and adjacent a portion of the cable loop for receiving production fluid carried by the plurality of production vessels; and
a rotating valve located adjacent a wellhead and an alternate portion of the cable, the rotating valve for delivering production fluid to the production vessels;
wherein the rotating valve is not located directly beneath the platform.

9. A method of producing oil and gas from a well, the method comprising:
a) attaching a plurality of production vessels to a closed cable loop that extends from a sea surface to a subsea location;
b) transporting the plurality of production vessels from the sea surface to the subsea location, the plurality of production vessels having hollow cavities containing seawater so that they are not buoyant;
c) filling the hollow cavities of the plurality of vessels with production fluid at the subsea location, the production fluid displacing the seawater contained in the hollow cavities of the production vessels, so that the production vessels become buoyant and rise to the sea surface;
d) connecting a plurality of receivers to a subsea wellhead for receiving production fluid from the subsea wellhead, the plurality of receivers configured to engage the production vessels and fill them with production fluid;
e) placing the plurality of receivers on an elliptical rail that is concaved upward and synchronizing the receivers to receive the production vessels as the production vessels arrive, and to release the production vessels at the end of the elliptical rail when the production vessels have been filled with the production fluid; and
f) rotating the closed cable loop as the production vessels move from the sea surface to the subsea location and back to the sea surface.

10. The method of claim 9, further comprising:
separating a hollow cavity within each production vessel, with a piston, into a seawater containing portion and a production fluid containing portion, the piston sealing the seawater containing portion from the production fluid containing portion;
positioning the piston in a first position adjacent an end of the hollow cavity so that the seawater containing portion is more voluminous than the production fluid containing portion;
moving the piston from the first position to a second position remote from the end of the hollow cavity so that the production fluid containing portion increases in volume; and
filling the production fluid containing portion of the hollow cavity with production fluid as the piston moves from the first position to the second position.

11. The method of claim 10, further comprising:
discharging the seawater from the seawater containing portion of the hollow cavity through vents in the production vessel as the piston moves from the first position to the second position.

12. The method of claim 10, further comprising:
locking the piston of each production vessel in the first position as the production vessel is transported from the sea surface to the subsea location; and
releasing the piston of each production vessel when the production vessel reaches the subsea position.

13. The method of claim 9, wherein step c) further comprises:
filling multiple production vessels with production fluid simultaneously by fluidly connecting each of the multiple production vessels to a separate production hose in fluid communication with a well.

14. The method of claim 9, further comprising:
draining the production fluid from the production vessels when the production vessels return to the sea surface from the subsea location; and
refilling the production vessels with seawater.

15. The method of claim 9, further comprising:
detaching the production fluid filled production vessels from the closed cable loop when the production vessels return to the sea surface from the subsea location;
attaching new seawater filled production vessels to the closed cable loop in place of the detached production fluid filled production vessels.

16. The method of claim 9, further comprising:
driving the rotation of the closed cable loop using a gear attached to the closed cable loop.

17. A system for bringing produced oil and gas from a subsea wellhead to a sea surface, the system comprising:
a cable loop having an upper end at or adjacent a sea surface and a lower end below the sea surface, the loop rotatable around a closed path;
a plurality of production vessels attached to the cable loop, each production vessel having a hollow interior that can be filled with seawater, the weight of the plurality of production vessels sufficient, when filled with seawater, to cause the production vessels to sink, the plurality of production vessels each having an inlet pipe attached thereto; and
a plurality of receivers in communication with a subsea wellhead that receive production fluid from the subsea wellhead, the plurality of receivers configured to engage the plurality of production vessels and fill them with production fluid while seawater in the production vessels is discharged from the production vessels, the production fluid having a lower density than ambient seawater, thereby causing the production vessels to become buoyant,
wherein the plurality of receivers are placed on an elliptical rail and the receivers are synchronized to receive the production vessels as the production vessels arrive, and to release the production vessels at the end of the elliptical rail when the production vessels have been filled with the production fluid.

18. The system of claim 17, further comprising:
a gear attached to the cable loop to help rotate the cable loop.

19. The system of claim 17, wherein each of the plurality of production vessels comprises:

a cylindrical body with having walls surrounding a hollow cavity; and a piston housed within the cylindrical hollow body and dividing the hollow void into two parts, the piston in sealed engagement with the walls of the cylindrical body and having a first position and a second position;

wherein the piston creates a vacuum in a portion of the hollow cavity as it moves from the first to the second position, which vacuum draws production fluid into the hollow cavity of the cylindrical body through the inlet pipe.

20. The system of claim 19, wherein each of the plurality of production vessels further comprise:

a vent between the hollow cavity of each production vessel and the ambient environment to allow seawater to exit each production vessel as the piston moves from the first to the second position.

* * * * *